UNITED STATES PATENT OFFICE.

BENJAMIN F. CARY, OF ELMIRA, NEW YORK.

PROCESS OF FORMING ANTISEPTIC DRESSINGS.

1,177,015.  Specification of Letters Patent.  Patented Mar. 28, 1916.

No Drawing.  Application filed April 21, 1915. Serial No. 22,762.

*To all whom it may concern:*

Be it known that I, BENJAMIN F. CARY, a citizen of the United States, residing at Elmira, in the county of Chemung and State of New York, have invented a new and Improved Process of Forming Antiseptic Dressings, of which the following is a specification.

The object of my invention is to enable the utilization of the antiseptic properties of iodin while avoiding its caustic action and at the same time to produce a form of dressing for wounds and sores which can be applied in a dry state without irritation of sensitive raw tissues and without the formation of a retentive crust.

To this end my process consists in first forming a solution of iodin in a volatile liquid having the property of penetrating the sporules of lycopodium powder such as sulfuric ether, alcohol, chloroform, carbon tetrachlorid, carbon disulfid, or other suitable, readily volatile, solvent of iodin. Lycopodium powder is then thoroughly mixed with the solution in such proportions as will produce a dressing of the desired strength in iodin. This may be somewhat varied, though I have found that in a dressing containing five per cent. of iodin the iodin and lycopodium oil are so proportioned as to give desirable results. Before mixing the lycopodium with the iodin solution the powder should be sifted through a fine sieve, say of 100 mesh, and sterilized by being heated in a closed vessel to 212° F. and then allowed to cool down to the room temperature. After the mixture is formed it is set aside and allowed to remain for a sufficient time to permit the solution to thoroughly permeate the mass and penetrate the sporules of the powder, to the end of bringing the iodin into intimate relation with the contained lycopodium oil. In practice I have found it well to allow a considerable time, as much as seven days, for this purpose. The volatile solvent is then evaporated out, as by exposing the mixture in shallow trays, so as to permit its spontaneous evaporation. After the powder is thoroughly dried it is again sifted and is then placed in closed containers and subjected to a temperature of approximately 150° F. for about one hour or until the iodizing of the lycopodium oil is completed. The dressing is then ready for use and is applied by dusting it upon the surface to be treated.

By this process the iodin is not simply mixed with the powder but is caused to penetrate the lycopodium sporules and to become intimately mixed with the lycopodium oil, which is iodized thereby.

As is well known the oil of lycopodium by itself possesses healing properties. I have found, however, that in the mixture of the oil and iodin, not only is the caustic quality of the iodin neutralized but the mixture acts as a local anesthetic, a property possessed by neither of its components alone, and may be applied to the most sensitive surfaces without irritating effect.

What I claim as new and desire to secure by Letters Patent is:

1. The process of forming an antiseptic dressing which consists in treating lycopodium powder with a solution of iodin so as to iodize the oil of lycopodium and evaporating the solvent so as to leave the mass in the form of a fine powder.

2. The process of forming an antiseptic dressing which consists in forming a solution of iodin with a volatile solvent, mixing lycopodium powder therewith, and evaporating the solvent so as to leave the mass in the form of a fine powder.

3. The process of forming an antiseptic dressing which consists in forming a solution of iodin with a volatile solvent, mixing lycopodium powder therewith, letting the mixture stand until the sporules of the powder are so penetrated by the solution as to bring the iodin and the lycopodium oil together, and evaporating the solvent.

4. The process of forming an antiseptic dressing which consists in forming a solution of iodin with a volatile solvent, mixing lycopodium powder therewith, bringing the solution into admixture with the lycopodium oil of the powder, whereby the oil is iodized, drying the mass, and finally heating to complete the iodization of the oil.

5. The process of forming an antiseptic dressing which consists in forming a solution of iodin and mixing lycopodium powder therewith, bringing the solution into admixture with the lycopodium oil of the powder whereby the oil is iodized, drying the mass and finally heating to complete the iodization of the oil.

6. The process of forming an antiseptic dressing which consists in forming a solution of iodin and mixing lycopodium powder therewith, bringing the solution into admixture with the lycopodium oil of the powder whereby the oil is iodized, drying the mass, and finally heating in a closed vessel to complete the iodization of the oil.

In testimony whereof, I have hereunto subscribed my name, this 14th day of April, A. D., 1915.

BENJAMIN F. CARY.

Witness:
JOHNSON BEERS.

Copies of this patent may be obtained for five cents each, by addressing the "Commissioner of Patents, Washington, D. C."